United States Patent Office 3,040,064
Patented June 19, 1962

3,040,064
ANTHRAQUINONE DYESTUFFS
Paul Grossmann, Binningen, Switzerland, assignor to Ciba Limited, Basel, Switzerland
No Drawing. Filed May 31, 1960, Ser. No. 32,537
Claims priority, application Switzerland July 6, 1959
6 Claims. (Cl. 260—380)

This invention provides valuable anthraquinone dyestuffs of the general formula (1) 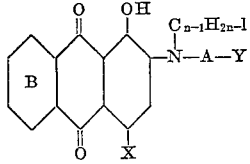

in which A represents an aliphatic or aromatic radical, X represents a hydrogen atom or an amino or alkylamino, acylamino or arylamino group or advantageously a hydroxyl group. Y represents an amino group that may be quaternated, and $n$ is a whole number not greater than 5, and in which the ring B may contain further substituents, for example a hydroxyl group.

The invention also provides a process for the manufacture of the dyestuffs of the above general formula wherein an anthraquinone of the formula (2) 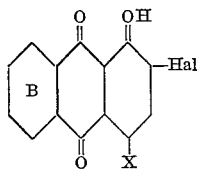

in which Hal. represents a halogen atom, for example, a chlorine atom, or more especially a bromine atom, X and B have the meanings given above, is reacted with a diamine of the formula

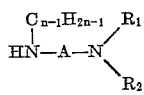

in which $R_1$ and $R_2$ each represent a hydrogen atom or an alkyl radical, and, if desired, the condensation product so obtained is treated with an alkylating agent.

Of special interest are those compounds of the Formula 2 in which X represents a hydroxyl group. These compounds are easily obtainable by chlorinating or more especially brominating 1:4-dihydroxy-anthraquinone. There may also be mentioned as starting materials, 1-hydroxy-2-bromanthraquinone, 1-hydroxy-2-bromo-4-aminoanthraquinone, 1-hydroxy-2-bromo-4-methylamino- or 1-hydroxy-2-bromo-phenylaminoanthraquinone.

As diamines of the Formula 3 there are used either aliphatic diamines, especially those containing at most six carbon atoms, or aromatic diamines, especially those of the benzene series. As examples there may be mentioned: ethylenediamine, tetra- or hexa-methylene diamine, N:N-dimethyl- or N:N-diethylethylene diamine, N:N-dimethylethylene diamine or N:N-dimethyl-1:3-propylene diamine, N:N-diethyl-1:3-propylene diamine and N:N-dimethyl-para-phenylene diamine.

The reaction is advantageously carried out at a raised temperature and preferably in an inert organic solvent, for example, a hydrocarbon, such as benzene, toluene or xylene, or a halogenated hydrocarbon, such as carbon-tetrachloride, tetrachlorethane, chlorobenzene, or ortho-dichlorobenzene, or a nitro-hydrocarbon, such as nitro-benzene, or naphthalene. Instead of an inert solvent a large excess of the amine may be used.

The dyestuffs so obtained correspond to the above Formula 1, wherein Y represents a primary, secondary or tertiary amine group. In general these dyestuffs dissolve well in water, especially when Y is a tertiary amino group. The solubility in water can be further enhanced by treating the dyestuffs with an alkylating agent, peralkylation causing simultaneous quaternation of the terminal amino group. As alkylating agents there may be mentioned alkyl halides or aralkyl halides, alkyl or aralkyl esters of sulfuric acid or of organic sulfonic acids, for example, methylchloride, methylbromide or iodide, benzylchloride, dimethylsulfate, diethylsulfate, benzenesulfonic acid methyl ester, para-toluene sulfonic acid ethyl or butyl ester.

The alkylation is generally carried out in one of the aforesaid inert organic solvents, or in a large excess of the alkylating agent. In the latter case care must be taken that the mixture is not heated excessively, since the reaction is strongly exothermic. Nevertheless, it is in most cases, especially in the presence of an organic solvent, necessary to heat the reaction externally in order to initiate the reaction.

In order to obtain good yields it is in some cases of advantage to use an excess of the alkylating agent.

When an inert organic solvent is used the dyestuff salt precipitates out during the reaction and can be isolated by filtration. The solvent can also be removed by distillation, for example, in vacuo or with steam.

The dyestuff salt is generally purified by dissolving it in water, and removing by filtration any unreacted starting dyestuff that may be present as an insoluble radical. From the aqueous solution the dyestuff can be separated by the addition of a water-soluble salt, for example, sodium chloride.

The quaternated dyestuffs preferably contain as the anion the radical of a strong acid, for example, of sulfuric acid or of a semi-ester thereof or the radical of an aryl sulfonic acid or a halogen ion. The aforesaid anions introduced into the dyestuff molecule by the process, may be replaced by anions of other inorganic acids, for example, phosphoric acid, or organic acids, for example, formic acid, acetic acid, chloracetic acid, oxalic acid, lactic acid or tartaric acid. In certain cases the free bases may be used. The dyestuff salts may also be used in the form of double salts, for example, with halides of the 2nd group of the periodic system, especially zinc chloride or cadmium.

The dyestuffs of this invention are suitable for dyeing a very wide variety of materials, for example, tanned cellulose fibers, silk, hair or fully synthetic fibers especially polyacrylonitrile, or fibers of asymmetrical dicyanethylene. These dyestuffs are also suitable for dyeing modified polyester fibers which contain acid groups. The dyeings produced on these fibers are distinguished by their good fastness to light.

The following examples illustrate the invention, the parts and percentages being by weight:

Example 1

6.4 parts of 2-bromoquinizarin are heated at 50–55° C. in 20 parts of diethylethylene diamine for half an hour. The dyestuff is precipitated by the dropwise addition of 100 parts of water and cooling to 0–5° C., and the dyestuff is filtered off after two hours, washed neutral and dried. The dyestuff is soluble in dilute acetic acid, and dyes polyacrylonitrile fibers from the latter solvent yellowish-red tints of extra fastness to light. Instead of diethylethylenediamine there may be used 1:3-dimethylpropylenediamine etc.

Example 2

3.5 parts of the dyestuff obtained as described in Example 1 are heated in 30 parts of nitro-benzene with 1.6 parts of dimethyl sulfate for one hour at 80° C. The peralkylated dyestuff precipitates. It is filtered off in the cold and washed with benzene and benzine. The dyestuff is completely soluble in water, and dyes polyacrylonitrile fibers from a weakly acetic acid solution somewhat more yellow and purer red tints than does the dyestuff of Example 1. The dyeings also have an excellent fastness to light. The same dyestuff can also be obtained by condensing 2-bromo-quinizarin with ethylene diamine and alkylating the condensation product with an excess of dimethylsulfate.

Instead of a dyestuff obtained from 2-bromoquinizarin and ethylenediamine, there may be used a dyestuff obtained from 2-bromoquinizarin and 1:3-propylene diamine or hexamethylene diamine.

Example 3

6.4 parts of 2-bromoquinizarin are heated in 30 parts of para-aminodimethylaniline at 130° C. for two hours. The whole is then cooled, and the dyestuff is precipitated with 30 parts of methanol, filtered off, and washed with methanol and dried.

The dyestuff is then peralkylated as described in Example 2. It dyes polyacrylonitrile fibers bluish-red tints of excellent fastness to light.

If in paragraph 1 instead of dimethylsulfate, ethylbromide or benzyl chloride are used as alkylating agents, dyestuffs having similar properties are obtained.

What is claimed is:

1. An anthraquinone dyestuff of the formula

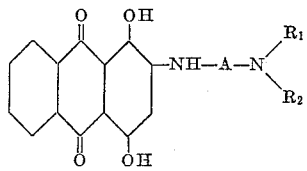

in which A is a member selected from the group consisting of lower alkylene and para-phenylene, and each of $R_1$ and $R_2$ is lower alkyl.

2. An anthraquinone dyestuff of the formula

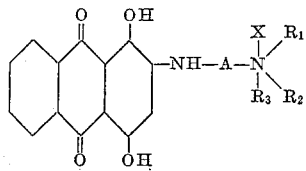

in which A is a member selected from the group consisting of lower alkylene and para-phenylene, each of $R_1$ and $R_2$ is lower alkyl, $R_3$ is a member selected from the group consisting of lower alkyl and benzyl, and X is a water-solubility enhancing anion.

3. The dyestuff of the formula

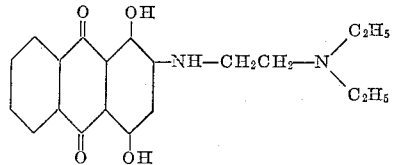

4. The dyestuff of the formula

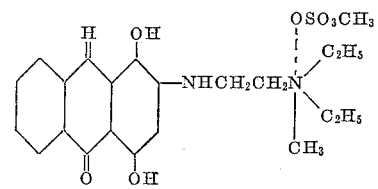

5. The dyestuff of the formula

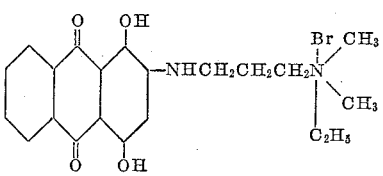

6. The dyestuff of the formula

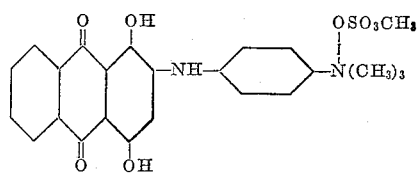

References Cited in the file of this patent

UNITED STATES PATENTS

| | | |
|---|---|---|
| 1,706,498 | Schmidt et al. | Mar. 26, 1929 |
| 2,093,590 | Schlichenmaier et al. | Sept. 21, 1937 |
| 2,611,772 | Allen et al. | Sept. 23, 1952 |
| 2,924,609 | Joyce | Feb. 9, 1960 |

FOREIGN PATENTS

| | | |
|---|---|---|
| 587,715 | Belgium | Feb. 17, 1960 |